United States Patent
Kwon et al.

(10) Patent No.: US 8,611,618 B2
(45) Date of Patent: Dec. 17, 2013

(54) APPARATUS AND METHOD FOR GENERATING REPRESENTATIVE FINGERPRINT TEMPLATE

(75) Inventors: Dongjin Kwon, Seoul (KR); Bo Gun Park, Seoul (KR); Bong Seop Song, Seoul (KR); Jae Won Lee, Gyeonggi-do (KR)

(73) Assignee: Suprema Inc., Seongnam-si (KR)

( * ) Notice: Subject to any disclaimer, the term of this patent is extended or adjusted under 35 U.S.C. 154(b) by 222 days.

(21) Appl. No.: 13/197,092

(22) Filed: Aug. 3, 2011

(65) Prior Publication Data

US 2012/0257802 A1 Oct. 11, 2012

(30) Foreign Application Priority Data

Apr. 7, 2011 (KR) ........................ 10-2011-0032152

(51) Int. Cl.
*G06K 9/00* (2006.01)
*G06K 9/68* (2006.01)

(52) U.S. Cl.
USPC .......................................... 382/124; 382/218

(58) Field of Classification Search
USPC .................. 382/124, 125, 217, 218
See application file for complete search history.

(56) References Cited

U.S. PATENT DOCUMENTS

| | | | |
|---|---|---|---|
| 2009/0138788 A1* | 5/2009 | Hahn et al. | 715/200 |
| 2010/0080425 A1* | 4/2010 | Bebis et al. | 382/125 |
| 2011/0138187 A1* | 6/2011 | Kaga et al. | 713/186 |
| 2011/0317882 A1* | 12/2011 | Muazam | 382/117 |

FOREIGN PATENT DOCUMENTS

| | | |
|---|---|---|
| KR | 10-2003-0006789 | 1/2003 |
| KR | 10-2004-0076897 | 9/2004 |
| KR | 10-2006-0074040 | 7/2006 |
| KR | 10-2008-0019833 | 3/2008 |

OTHER PUBLICATIONS

Li et al. "Score Based Biometric Template Selection and Update." Second International Conference on Future Generation Communication and Networking, vol. 3, Dec. 13, 2008, pp. 35-40.*

* cited by examiner

*Primary Examiner* — Jon Chang
(74) *Attorney, Agent, or Firm* — NSIP Law (57) ABSTRACT

An apparatus for generating a representative fingerprint template is provided. The apparatus includes a calculation unit configured to calculate levels of similarity between N fingerprint templates; and a selection unit configured to select at least one fingerprint template from among the N fingerprint templates as a representative fingerprint template.

18 Claims, 4 Drawing Sheets

APPARATUS AND METHOD FOR GENERATING REPRESENTATIVE FINGERPRINT TEMPLATE

CROSS-REFERENCE TO RELATED APPLICATION(S)

This application claims the benefit under 35 U.S.C. §119 (a) of Korean Patent Application No. 10-2011-0032152, filed on Apr. 7, 2011, in the Korean Intellectual Property Office, the entire disclosure of which is incorporated herein by reference for all purposes.

BACKGROUND

1. Field

The following description relates to selecting at least one fingerprint template from among a plurality of fingerprint templates as a representative fingerprint template and updating attribute information of one or more feature points that are included in the representative fingerprint template.

2. Description of the Related Art

Biometric authentication has recently been popular and widespread because the intrinsic physical traits of humans that are subject to biometrics, such as, for example, fingerprints, iris patterns, voice patterns, facial features, and blood vessels vary from one person to another, do not need to be carried around, are less likely to be stolen or counterfeited, and almost stay the same throughout the lifetime.

Fingerprint recognition, from among other biometric authentication techniques, has been most widely used for various reasons such as, for example, the convenience of use, high security, high cost effectiveness, and the like.

Fingerprint-based user authentication begins with the registration and storing of fingerprint images that are to be used in fingerprint authentication. Then, in response to a fingerprint image being received from a user who is to be authenticated, the received fingerprint image may be compared with the registered fingerprint images, and a determination may be made as to whether the user is a legitimate user based on whether there is a match for the received fingerprint image among the registered fingerprint images.

In this process, not only the quality of the received fingerprint image but also the quality of the registered fingerprint images considerably affects the performance of fingerprint authentication. That is, registered fingerprint images with poor quality may lead to a deterioration of the performance of fingerprint authentication regardless of the use of high-performance authentication algorithms with excellent restoration capabilities.

SUMMARY

In one general aspect, there is provided an apparatus for generating a representative fingerprint template, including: a calculation unit configured to calculate levels of similarity between N fingerprint templates; and a selection unit configured to select at least one fingerprint template from among the N fingerprint templates as a representative fingerprint template.

The apparatus may also include an extraction unit configured to extract attribute information of one or more feature points that are included in the N fingerprint templates, wherein the calculation unit is further configured to calculate the levels of similarity between the N fingerprint templates by comparing the extracted attribute information.

The apparatus may also include an update unit configured to extract one or more second feature points that match one or more first feature points that are included in the representative fingerprint template from the N fingerprint templates except for the representative fingerprint template and update attribute information of the first feature points based on attribute information of the extracted second feature points.

The update unit may also be configured to update the attribute information of the first feature points with a weighted sum of the attribute information of the first feature points and the attribute information of the extracted second feature points.

The calculation unit may also be configured to calculate and add levels of similarity of each of the N fingerprint templates to the rest of the N fingerprint templates and the selection unit may also be configured to select a fingerprint template with a greatest similarity level sum from among the N fingerprint templates as a first representative fingerprint template.

The apparatus may also include an extraction unit configured to extract one or more fingerprint templates with a lower level of similarity than a reference level to the first representative fingerprint template, wherein the calculation unit may also be configured to calculate and add levels of similarity of each of the extracted fingerprint templates to the rest of the extracted fingerprint templates, and the selection unit may also be configured to select a fingerprint template with a greatest similarity level sum from among the extracted fingerprint templates as a second representative fingerprint template.

The calculation unit may also be configured to calculate and add levels of each of the N fingerprint templates to the rest of the N fingerprint templates and the selection unit may also be configured to select a fingerprint template with a greatest similarity level sum as a first representative fingerprint template and select a fingerprint template with a lowest level of similarity to the first representative fingerprint template as a second representative fingerprint template.

The selection unit may also be configured to select a fingerprint template with a least sum of levels of similarity to the first and second representative fingerprint templates as a third representative fingerprint template.

The apparatus may also include a classification unit configured to classify the N fingerprint templates into first and second groups, each group including one or more fingerprint templates, wherein the calculation unit may also be configured to calculate and add levels of similarity of each of the first-group fingerprint templates to the rest of the first-group fingerprint templates and to calculate and add levels of similarity of each of the second-group fingerprint templates to the rest of the second-group fingerprint templates and the selection unit may also be configured to select a first-group fingerprint template with a greatest similarity level sum and a second-group fingerprint template with a greatest similarity level sum as first and second representative fingerprint templates, respectively.

In another general aspect, there is provided a method of generating a representative fingerprint template, including: calculating levels of similarity between N fingerprint templates; and selecting at least one fingerprint template from among the N fingerprint templates as a representative fingerprint template.

The method may also include extracting attribute information of one or more feature points that are included in the N fingerprint templates, wherein the calculating the levels of similarity between the N fingerprint templates includes calculating the levels of similarity between the N fingerprint templates by comparing the extracted attribute information.

The method may also include extracting one or more second feature points that match one or more first feature points that are included in the representative fingerprint template from the N fingerprint templates except for the representative fingerprint template; and updating attribute information of the first feature points based on attribute information of the extracted second feature points.

The updating the attribute information of the first feature points may include updating the attribute information of the first feature points with a weighted sum of the attribute information of the first feature points and the attribute information of the extracted second feature points.

The calculating the levels of similarity between the N fingerprint templates may include calculating and adding levels of similarity of each of the N fingerprint templates to the rest of the N fingerprint templates and the selecting the at least one fingerprint template may include selecting a fingerprint template with a greatest similarity level sum from among the N fingerprint templates as a first representative fingerprint template.

The method may also include extracting one or more fingerprint templates with a lower level of similarity than a reference level to the first representative fingerprint template, wherein the calculating the levels of similarity between the N fingerprint templates includes calculating and adding levels of similarity of each of the extracted fingerprint templates to the rest of the extracted fingerprint templates, and the selecting the at least one fingerprint template includes selecting a fingerprint template with a greatest similarity level sum from among the extracted fingerprint templates as a second representative fingerprint template.

The calculating the levels of similarity between the N fingerprint templates may include calculating and adding levels of each of the N fingerprint templates to the rest of the N fingerprint templates and the selecting the at least one fingerprint template may include selecting a fingerprint template with a greatest similarity level sum as a first representative fingerprint template and selecting a fingerprint template with a lowest level of similarity to the first representative fingerprint template as a second representative fingerprint template.

The selecting the at least one fingerprint template may also include selecting a fingerprint template with a least sum of levels of similarity to the first and second representative fingerprint templates as a third representative fingerprint template.

The method may also include classifying the N fingerprint templates into first and second groups, each group including one or more fingerprint templates, wherein the calculating the levels of similarity between the N fingerprint templates includes calculating and adding levels of similarity of each of the first-group fingerprint templates to the rest of the first-group fingerprint templates and calculating and adding levels of similarity of each of the second-group fingerprint templates to the rest of the second-group fingerprint templates and the selecting the at least one fingerprint template includes selecting a first-group fingerprint template with a greatest similarity level sum and a second-group fingerprint template with a greatest similarity level sum as first and second representative fingerprint templates, respectively.

Other features and aspects may be apparent from the following detailed description, the drawings, and the claims.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
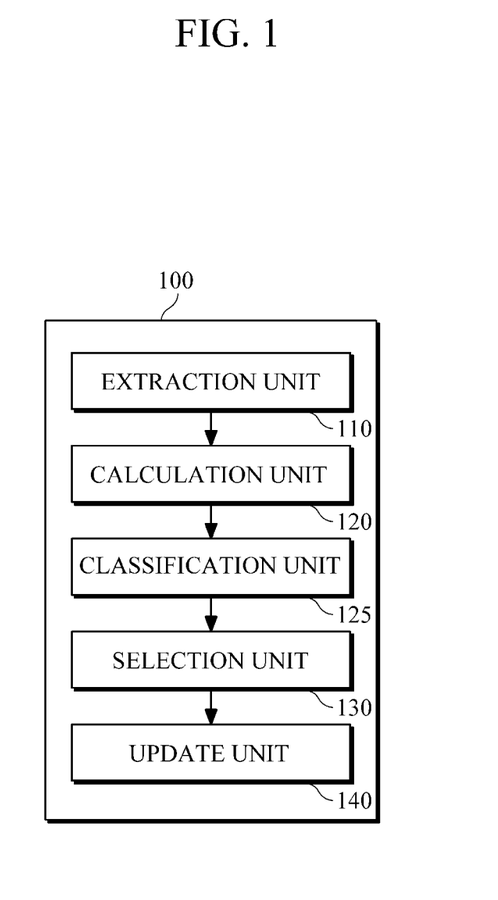
FIG. 1 is a diagram illustrating an example of an apparatus for generating a representative fingerprint template.

FIG. 1 illustrates an example of an apparatus for generating a representative fingerprint template.

Referring to FIG. 1, apparatus 100 includes an extraction unit 110, a calculation unit 120, a classification unit 125, a selection unit 130, and an update unit 140. For example, a fingerprint template may include attribute information of one or more feature points of a fingerprint, and may be a template that is obtained by registering a user's fingerprints in advance.

The extraction unit 110 may extract attribute information of one or more feature points that are included in each of N fingerprint templates. The attribute information may include the positions of one or more feature points, the angles of the feature points, the reliability levels of the feature points, the curvature near the feature points, the thickness of ridges near the feature points, and the like.

The calculation unit 120 may calculate the levels of similarity between the N fingerprint templates. For example, the calculation unit 120 may calculate the levels of similarity between the N fingerprint templates based on the attribute information extracted by the extraction unit 110. For example, the calculation unit 120 may calculate the level of similarity between first and second fingerprint templates based on whether and how much the feature points that are included in the first fingerprint template match the feature points that are included in the second fingerprint template. For example, the level of similarity between the first and second fingerprint templates may have a value within the range of 0 to 1. The closer the level of similarity between the first and second fingerprint template is to 1, the more similar the first and second fingerprint templates are. In another example, the level of similarity between the first and second fingerprint templates may have a value outside the range of 0 to 1. In the example illustrated in FIG. 1, the levels of similarity between the N fingerprint templates may be calculated based on attribute information of the feature points that are included in each of the N fingerprint templates. In another example, the levels of similarity between the N fingerprint templates may be calculated based on the vector values of corresponding fingerprints.

The calculation unit 120 may calculate and add the levels of similarity of each of the N fingerprint templates to the other (N−1) fingerprint templates.

For example, assume that the level of similarity between the first and second fingerprint templates is S12, that the level of similarity between the second fingerprint template and a third fingerprint template is S23, and that the level of similarity between the first and third fingerprint templates is S13. The calculation unit 120 may calculate the levels of similarity of the first fingerprint template to the second and third fingerprint templates, and may add the results of the calculation (i.e., S12+S13). The calculation unit 120 may calculate the levels of similarity of the second fingerprint template to the first and third fingerprint templates, and may add the results of the calculation (i.e., S12+S23). The calculation unit 120 may calculate the levels of similarity of the third fingerprint template to the first and second fingerprint templates, and may add the results of the calculation (i.e., S13+S23).

The selection unit 130 may select one of the N fingerprint templates as a representative fingerprint template based on the results of the calculation performed by the calculation unit 120.

For example, the selection unit 130 may select, from among the N fingerprint templates, a fingerprint template with a greatest similarity level sum as a representative fingerprint template.

In another example, the selection unit 130 may select the fingerprint template with the greatest similarity level sum as a first representative fingerprint template, and may select a fingerprint template with a lowest level of similarity to the first representative fingerprint template as a second representative fingerprint template.

In another example, the selection unit 130 may select the fingerprint template with the greatest similarity level sum as a first representative fingerprint template, the fingerprint template with the lowest level of similarity to the first representative fingerprint template as a second representative fingerprint template, and a fingerprint template with a least sum of levels of similarity to the first and second representative fingerprint templates as a third representative fingerprint template. In this manner, the selection unit 130 may select M representative fingerprint templates from among the N fingerprint templates (where M≤N).

In another example, the selection unit 130 may select, from among the N fingerprint templates, the fingerprint template with the greatest similarity level sum as a first representative fingerprint template. The extraction unit 110 may extract one or more fingerprint templates with a lower level of similarity to the first representative fingerprint template than a reference value. The calculation unit 120 may calculate and add the levels of similarity of each of the extracted fingerprint templates to the other extracted fingerprint templates. The selection unit 130 may select, from among the extracted fingerprint templates, a fingerprint template with a greatest similarity level sum as a second representative fingerprint template. For example, in a case in which there are six fingerprint templates, the selection unit 130 may select, from among the six fingerprint templates, a fingerprint template with a greatest similarity level sum as a first representative fingerprint template. The selection unit 130 may extract three fingerprint templates with a lower level of similarity to the first representative fingerprint template than the reference value. The calculation unit 120 may calculate and add the levels of similarity of each of the three extracted fingerprint templates to the other two extracted fingerprint templates. The selection unit 130 may select, from among the three extracted fingerprint templates, a fingerprint template with a greatest similarity level sum as a second representative fingerprint template.

In another example, the classification unit 125 may classify the N fingerprint templates into a first fingerprint template group including one or more fingerprint templates (hereinafter referred to as the first-group fingerprint templates) and a second fingerprint template group including one or more fingerprint templates (hereinafter referred to as the second-group fingerprint templates). The calculation unit 120 may calculate and add the levels of similarity of each of the first-group fingerprint templates to the other first-group fingerprint templates, and may calculate and add the levels of similarity of each of the second-group fingerprint templates to the other second-group fingerprint templates. The selection unit 130 may select a first-group fingerprint template with a greatest similarity level sum as a first representative fingerprint template, and may select a second-group fingerprint template with a greatest similarity level sum as a second representative fingerprint template. For example, if there are six fingerprint templates and the six fingerprint templates are classified into first and second fingerprint template groups, each group including three fingerprint templates, the calculation unit 120 may calculate and add the levels of similarity of each of the three first-group fingerprint templates to the other first-group fingerprint templates, and may calculate and add the levels of similarity of each of the three second-group fingerprint templates to the other second-group fingerprint templates. The selection unit 130 may select one of the three first-group fingerprint templates as a first representative fingerprint template. In this example, the first representative fingerprint template may be one of the three first-group fingerprint templates with a greatest similarity level sum. The selection unit 130 may select one of the three second-group fingerprint templates as a second representative fingerprint template. In this example, the second representative fingerprint template may be one of the three second-group fingerprint templates with a greatest similarity level sum.

The update unit 140 may extract one or more second feature points that match one or more first feature points that are included in a representative fingerprint template selected by the selection unit 130 from the rest of the N fingerprint templates. The update unit 140 may update attribute information of the first feature points based on attribute information of the extracted second feature points. For example, the term 'update' indicates changing the value of a parameter corresponding to attribute information. For example, the update unit 140 may update the attribute information of the first feature points with a weighted sum of the attribute information of the first feature points and the attribute information of the extracted second feature points.

In another example, the apparatus 100 may update the attribute information of each of the feature points that are included in the N fingerprint templates, and may select one of the N fingerprint templates as a representative fingerprint template. The update unit 140 may select one or more second feature points that match one or more first feature points that are included in one of the N representative fingerprint templates from the rest of the N fingerprint templates. The update unit 140 may update attribute information of the first feature points based on attribute information of the extracted second feature points. In this manner, the update unit 140 may update the attribute information of each of the feature points that are included in the N fingerprint templates. The selection unit 130 may select one of the N fingerprint templates that are updated by the update unit 140 as a representative fingerprint template based on the results of calculation performed by the calculation unit 120.

The apparatus 100 may calculate the levels of similarity between a plurality of fingerprint templates, and may select at least one of the plurality of fingerprint templates as a representative fingerprint template, and may update attribute information of each feature point that is included in the representative fingerprint template, thereby creating a high-quality representative fingerprint template. Accordingly, it is possible to improve the performance of authentication by performing user authentication using the high-quality representative fingerprint template.

Figure 2:
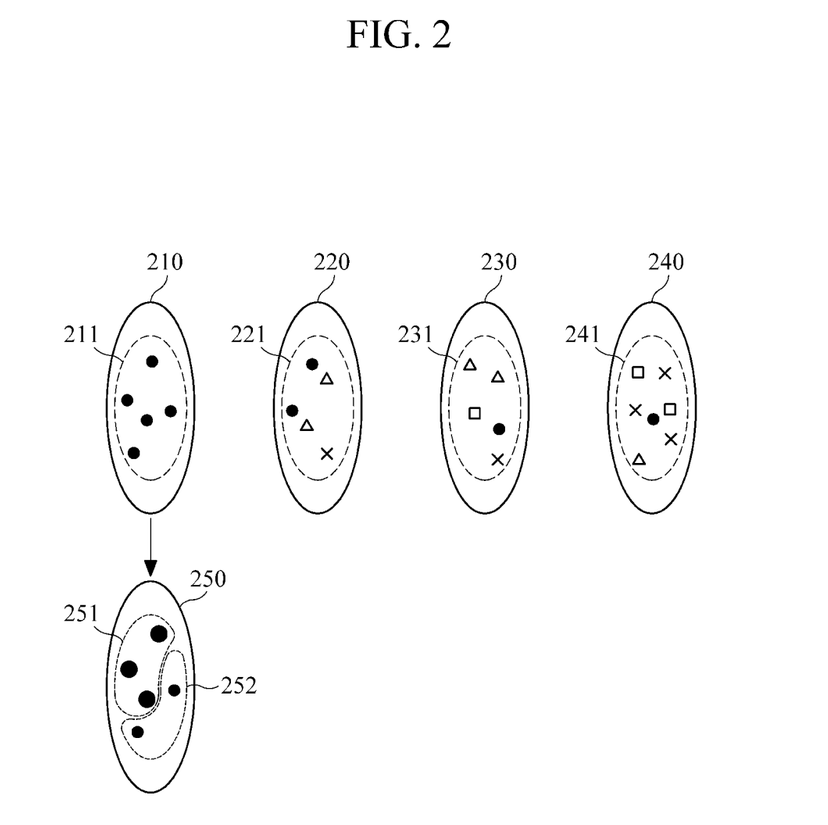
FIG. 2 is a diagram illustrating an example of generating a representative fingerprint template, which is performed by the apparatus illustrated in FIG. 1.

FIG. 2 illustrates an example of generating a representative fingerprint template, which is performed by the apparatus 100.

Referring to FIGS. 1 and 2, the extraction unit 110 may extract first, second, third, and fourth attribute information 211, 221, 231, and 241 from first, second, third, and fourth fingerprint templates 210, 220, 230, and 240, respectively. For example, each of the first, second, third, and fourth attribute information 211, 221, 231, and 241 may include the positions of one or more feature points, the angles of the feature points, the reliability levels of the feature points, the curvature near the feature points, the thickness of ridges near the feature points, and the like. Referring to FIG. 2, different geometric figures or symbols such as circles, triangles, rectangles, and x marks indicate different types of attribute information. In an example, FIG. 1 illustrates four fingerprint templates, but there is no limit to the number of fingerprint templates.

The calculation unit 120 may compare the first, second, third, and fourth attribute information 211, 221, 231, and 241, and may calculate the levels of similarity between the first, second, third, and fourth fingerprint templates 210, 220, 230, and 240 based on the results of the comparison. For example, the calculation unit 120 may calculate a level S 12 of similarity between the first and second fingerprint templates 210 and 220, a level S13 of similarity between the first and third fingerprint templates 210 and 230, a level S14 of similarity between the first and fourth fingerprint templates 210 and 240, a level S23 of similarity between the second and third fingerprint templates 220 and 230, a level S24 of similarity between the second and fourth fingerprint templates 220 and 240. For example, the similarity levels S12, S13, S14, S23, and S24 may have a value from 0 to 1. In this example, the closer the similarity levels S12, S13, S14, S23, and S24 are to 1, the more their respective pairs of fingerprint templates are similar.

The calculation unit 120 may calculate the levels of similarity of each of N fingerprint templates to the rest of the N fingerprint templates. For example, the calculation unit 120 may calculate the levels of similarity of the first fingerprint template 210 to the second, third, and fourth fingerprint templates 220, 230, and 240, i.e., S12, S13, and S14, may calculate the levels of similarity of the second fingerprint template 220 to the first, third, and fourth fingerprint templates 210, 230, and 240, i.e., S12, S23, and S24, may calculate the levels of similarity of the third fingerprint template 230 to the first, second, and fourth fingerprint templates 210, 220, and 240, i.e., S13, S23, and S34, and may calculate the levels of similarity of the fourth fingerprint template 240 to the first, second, and third fingerprint templates 210, 220, and 230, i.e., S14, S24, and S34.

The calculation unit 120 may add the levels of similarity of each of the N fingerprint templates to the rest of the N fingerprint templates. For example, the calculation unit 120 may add the levels of similarity of the first fingerprint template 210 to the second, third, and fourth fingerprint templates 220, 230, and 240 (i.e., S12+S13+S14), may add the levels of similarity of the second fingerprint template 220 to the first, third, and fourth fingerprint templates 210, 230, and 240 (i.e., S12+S23+S24), may add the levels of similarity of the third fingerprint template 230 to the first, second, and fourth fingerprint templates 210, 220, and 240 (i.e., S13+S23+S34), and may add the levels of similarity of the fourth fingerprint template 240 to the first, second, and third fingerprint templates 210, 220, and 230 (i.e., S14+S24+S34).

The selection unit 130 may select a fingerprint template with a greatest similarity sum from among the first, second, third, and fourth fingerprint templates 210, 220, 230, and 240 as a representative fingerprint template 250. For example, assume that the first fingerprint template 210 has a greatest similarity sum (i.e., S12+S13+S14). In this example, the selection unit 130 may select the first fingerprint template 210 as the representative fingerprint template 250.

The update unit 140 may extract one or more second feature points that match one or more first feature points that are included in the representative fingerprint template 250 from the second, third, and fourth fingerprint templates 220, 230, and 240. Referring to FIG. 2, the extracted second feature points includes two feature points that are extracted from the second fingerprint template 220, and that are represented as circles, and one feature point that is extracted from the fourth fingerprint template 240, and that is also represented as a circle. The update unit 140 may update attribute information of the first feature points based on attribute information of the extracted second feature points. For example, in response to one or more second feature points being extracted, the update unit 140 may update attribute information of feature points 251 respectively corresponding to the extracted second feature points based on attribute information of the extracted second feature points. Referring to FIG. 2, the first feature points 251 are displayed in a larger size than other first feature points 252 in the representative fingerprint template 250 to indicate that the attribute information of the first feature points 251 is updated. The update unit 140 may not update attribute information of the other first feature points 252 that have no matching second feature points in the second, third, and fourth fingerprint templates 220, 230, and 240.

The update unit 140 may update the attribute information of the first feature points in the representative fingerprint template 250 with a weighted sum of the attribute information of the first feature points and the attribute information of the extracted second feature points. For example, assume that attribute information to be updated is a reliability level. For example, assume that there is a first feature point having a reliability level R1 and having two matching second feature points, one from the second fingerprint template 220 and the other from the third fingerprint template 230, that the matching second feature point from the second fingerprint template 220 and the matching second feature point from the third fingerprint template 230 have reliability levels R2 and R3, respectively, and that the first feature point has no matching second feature point in the fourth fingerprint template 240. In this example, the update unit 140 may update the reliability level R1 with a weighted sum of the reliability levels R1, R2, and R3 that is calculated using the following equation: $R1=\alpha*R1+\beta*R2+\gamma*R3$ where $\alpha$, $\beta$, and $\gamma$ are weights that may be determined in various manners by a user or the manufacture of the apparatus 100. The update unit 140 may update not only the reliability level R1 but also other attribute information of the first feature point such as, for example, the curvature near the first feature point, and the thickness of ridges near the first feature point, using the same method used to update the reliability level R1. The update unit 140 may update attribute information of all the feature points that are included in the representative fingerprint template 250 using the above-mentioned method.

In another example, the apparatus 100 may update attribute information of all the feature points that are included in the first, second, third, and fourth fingerprint templates 210, 220, 230, and 240, and may select a fingerprint template with a greatest similarity level sum, for example, the first fingerprint template 210, as the representative fingerprint template 250.

Figure 3:
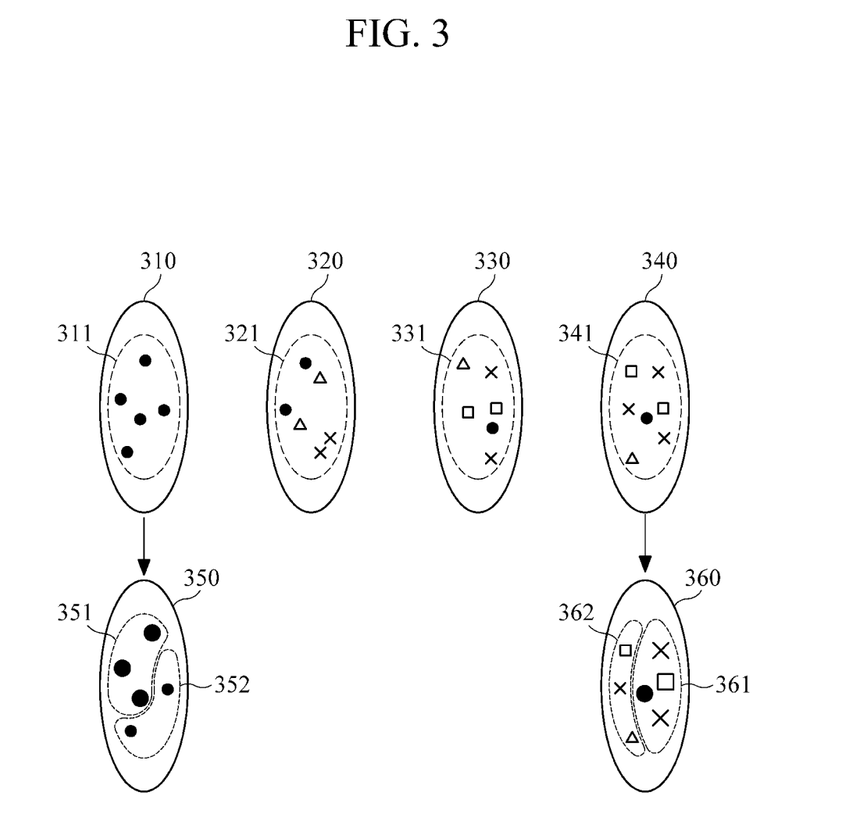
FIG. 3 is a diagram illustrating another example of generating a representative fingerprint template, which is performed by the apparatus illustrated in FIG. 1.

FIG. 3 illustrates another example of generating a representative fingerprint template, which is performed by the apparatus 100.

Referring to FIGS. 1 and 3, the extraction unit 110 may extract first, second, third, and fourth attribute information 311, 321, 331, and 341 from first, second, third, and fourth fingerprint templates 310, 320, 330, and 340, respectively. For example, each of the first, second, third, and fourth attribute information 311, 321, 331, and 341 may include the positions of one or more feature points, the angles of the feature points, the reliability levels of the feature points, the curvature near the feature points, the thickness of ridges near the feature points, and the like. Referring to FIG. 3, different geometric figures or symbols such as circles, triangles, rectangles, and x marks indicate different types of attribute information. In an example, FIG. 1 illustrates four fingerprint templates, but there is no limit to the number of fingerprint templates.

The calculation unit 120 may compare the first, second, third, and fourth attribute information 311, 321, 331, and 341, and may calculate the levels of similarity between the first, second, third, and fourth fingerprint templates 310, 320, 330, and 340 based on the results of the comparison. For example, the calculation unit 120 may calculate a level of similarity between the first and second fingerprint templates 310 and 320 (i.e., S12), a level of similarity between the first and third fingerprint templates 310 and 330 (i.e., S13), a level of similarity between the first and fourth fingerprint templates 310 and 340 (i.e., S14), a level of similarity between the second and third fingerprint templates 320 and 330 (i.e., S23), a level of similarity between the second and fourth fingerprint templates 320 and 340 (i.e., S24). For example, the calculated similarity levels may have a value within the range of 0 to 1. In this example, the closer the calculated similarity levels are to 1, the more their respective pairs of fingerprint templates are similar. In another example, the calculated similarity levels may have a value outside the range of 0 to 1.

The calculation unit 120 may calculate the levels of similarity of each of N fingerprint templates to the rest of the N fingerprint templates. For example, the calculation unit 120 may calculate the levels of similarity of the first fingerprint template 310 to the second, third, and fourth fingerprint templates 320, 330, and 340 (i.e., S12, S13, and S14), may calculate the levels of similarity of the second fingerprint template 320 to the first, third, and fourth fingerprint templates 310, 330, and 340 (i.e., S12, S23, and S24), may calculate the levels of similarity of the third fingerprint template 330 to the first, second, and fourth fingerprint templates 310, 320, and 340 (i.e., S13, S23, and S34), and may calculate the levels of similarity of the fourth fingerprint template 340 to the first, second, and third fingerprint templates 310, 320, and 330 (i.e., S14, S24, and S34).

The calculation unit 120 may add the levels of similarity of each of the N fingerprint templates to the rest of the N fingerprint templates. For example, the calculation unit 120 may add the levels of similarity of the first fingerprint template 310 to the second, third, and fourth fingerprint templates 320, 330, and 340 (i.e., S12+S13+S14), may add the levels of similarity of the second fingerprint template 320 to the first, third, and fourth fingerprint templates 310, 330, and 340 (i.e., S12+S23+S24), may add the levels of similarity of the third fingerprint template 330 to the first, second, and fourth fingerprint templates 310, 320, and 340 (i.e., S13+S23+S34), and may add the levels of similarity of the fourth fingerprint template 340 to the first, second, and third fingerprint templates 310, 320, and 330 (i.e., S14+S24+S34).

The selection unit 130 may select a fingerprint template with a greatest similarity sum and a fingerprint template having a lowest level of similarity to the fingerprint template with the greatest similarity sum from among the first, second, third, and fourth fingerprint templates 310, 320, 330, and 340 as representative fingerprint templates. For example, assume that the first fingerprint template 310 has a greatest similarity sum (S12+S13+S14), and that the fourth fingerprint template 340 has a lowest level of similarity to the first fingerprint template 310. In this example, the selection unit 130 may select the first and fourth fingerprint templates 310 and 340 as first and second representative fingerprint templates 350 and 360, respectively.

In another example, the selection unit 130 may select a fingerprint template with a greatest similarity level sum as a first representative fingerprint template, may select a fingerprint template with a lowest level of similarity to the first representative fingerprint template as a second representative fingerprint template, and may select a fingerprint template with a least sum of levels of similarity to the first and second representative fingerprint templates as a third representative fingerprint template. For example, assume that the first fingerprint template 310 has a greatest similarity sum (S12+S13+S14), that the fourth fingerprint template 340 has a lowest level of similarity to the first fingerprint template 310, and that the third fingerprint template 330 has a least sum of the levels of similarity to the first and fourth fingerprint templates 310 and 340. In this example, the selection unit 130 may select the first, fourth, and third fingerprint templates 310, 340, and 330 as representative fingerprint templates.

The update unit 140 may update attribute information of feature points 351 that are included in the first representative fingerprint template 350 based on the second, third, and fourth attribute information 321, 331, and 341 of the second, third, and fourth fingerprint templates 320, 330, and 340. For example, in response to one or more matching second feature points for first feature points 351 that are included in the first representative fingerprint template 350 being extracted from the second, third, and fourth fingerprint templates 320, 330, and 340, the update unit 140 may update attribute information of the first feature points 351 based on attribute information of the extracted second feature points. Referring to FIG. 3, the feature points 351 are displayed in a larger size than other first feature points 352 in the first representative fingerprint template 350 to indicate that the attribute information of the first feature points 351 is updated. The update unit 140 may not update attribute information of the other first feature points 352 that have no matching second feature points in the second, third, and fourth fingerprint templates 320, 330, and 340.

The update unit 140 may also update attribute information of feature points 361 that are included in the second representative fingerprint template 360 based on the second, third, and fourth attribute information 311, 321, and 331 of the first, second, and third fingerprint templates 310, 320, and 330. For example, in response to one or more matching second feature points for first feature points 361 that are included in the second representative fingerprint template 360 being extracted from the first, second, and third fingerprint templates 310, 320, and 330, the update unit 140 may update attribute information of the first feature points 351 based on attribute information of the extracted second feature points. Referring to FIG. 3, the feature points 361 are displayed in a larger size than other first feature points 362 in the second representative fingerprint template 360 to indicate that the attribute information of the first feature points 361 is updated. The update unit 140 may not update attribute information of the other first feature points 362 that have no matching second feature points in the first, second, and third fingerprint templates 310, 320, and 330.

The update unit 140 may update the attribute information of the first feature points in the first representative fingerprint template 350 with a weighted sum of the attribute information of the first feature points and the attribute information of the extracted second feature points. For example, assume that attribute information to be updated is a reliability level. For example, assume that there is a first feature point having a reliability level R1 and having two matching second feature points, one from the second fingerprint template 320 and the other from the third fingerprint template 330, that the matching second feature point from the second fingerprint template 320 and the matching second feature point from the third fingerprint template 330 have reliability levels R2 and R3, respectively, and that the first feature point has no matching second feature point in the fourth fingerprint template 340. In this example, the update unit 140 may update the reliability level R1 with a weighted sum of the reliability levels R1, R2, and R3 that is calculated using the following equation: $R1=\alpha*R1+\beta*R2+\gamma*R3$ where $\alpha$, $\beta$, and $\gamma$ are weights that may be determined in various manners by a user or the manufacture of the apparatus 100. The update unit 140 may update not only the reliability level R1 but also other attribute information of the first feature point such as, for example, the curvature near the first feature point, and the thickness of ridges near the first feature point, using the same method used to update the reliability level R1. The update unit 140 may update not only attribute information of all the feature points that are included in the first representative fingerprint template 350 but also attribute information of all the feature points that are included in the second representative fingerprint template 360 using the above-mentioned method.

In another example, the apparatus 100 may update attribute information of all the feature points that are included in the first, second, third, and fourth fingerprint templates 310, 320, 330, and 340, and may select a fingerprint template with a greatest similarity level sum and a fingerprint template with a lowest level of similarity to the fingerprint template with the greatest similarity level sum from among the first, second, third, and fourth fingerprint templates 310, 320, 330, and 340 as representative fingerprint templates.

Figure 4:
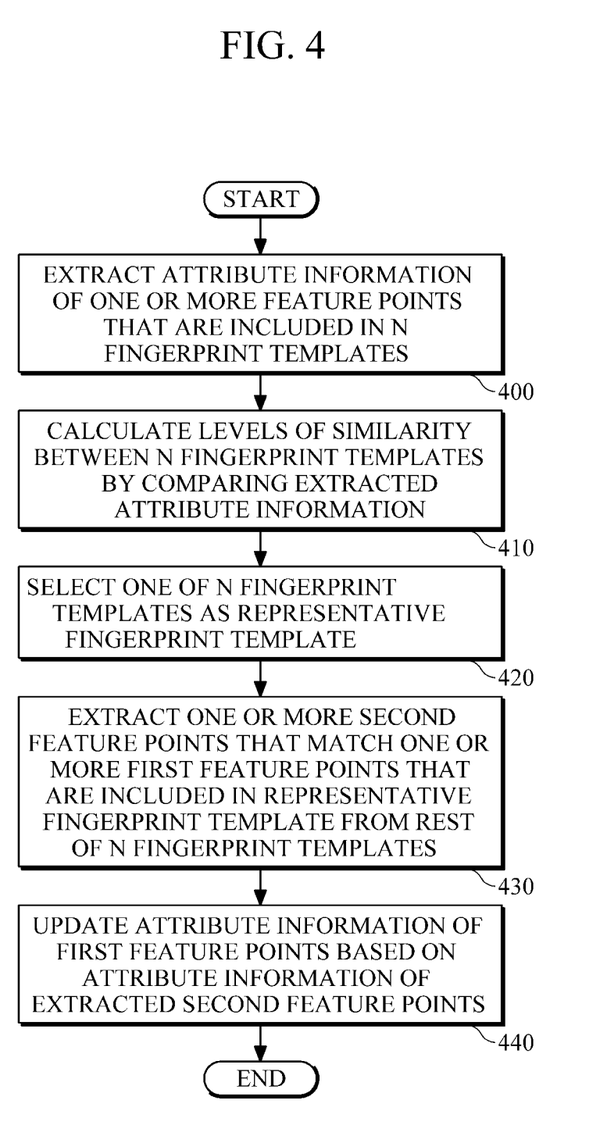
FIG. 4 is a flowchart illustrating an example of a method of generating a representative fingerprint template.

FIG. 4 illustrates an example of a method of generating a representative fingerprint template.

Referring to FIG. 4, in 400, an apparatus for generating a representative fingerprint template may extract attribute information of one or more feature points that are included in N fingerprint templates. In 410, the apparatus may calculate the levels of similarity between the N fingerprint templates by comparing the extracted attribute information. For example, the apparatus may calculate the levels of similarity between the N fingerprint templates based on whether the N fingerprint templates share the same feature points with one another and how many feature points the N fingerprint templates share with one another. In 420, the apparatus may select at least one of the N fingerprint templates as a representative fingerprint template based on the results of the calculation performed in 410.

For example, the apparatus may calculate and add the levels of similarity of each of the N fingerprint templates to the rest of the N fingerprint templates, and may select a fingerprint template with a greatest similarity level sum from among the N fingerprint templates as a representative fingerprint template.

In another example, the apparatus may select the fingerprint template with the greatest similarity level sum as a first representative fingerprint template, and may select a fingerprint template with a lowest level of similarity to the first representative fingerprint template as a second representative fingerprint template.

In another example, the apparatus may select the fingerprint template with the greatest similarity level sum as a first representative fingerprint template, may select the fingerprint template with the lowest level of similarity to the first representative fingerprint template as a second representative fingerprint template, and may select a fingerprint template with a least sum of levels of similarity to the first and second representative fingerprint templates as a third representative fingerprint template. In this manner, the apparatus may select M representative fingerprint templates from among the N fingerprint templates.

In 430, the apparatus may extract one or more second feature points that match one or more first feature points that are included in the representative fingerprint template from the N fingerprint templates except for the representative fingerprint template.

In 440, the apparatus may update attribute information of the first feature points based on attribute information of the extracted second feature points.

For example, the apparatus may update the attribute information of the first feature points with a weighted sum of the attribute information of the first feature points and the attribute information of the extracted second feature points.

In another example, the apparatus may update the attribute information of all the feature points that are included in the N fingerprint templates, and may select at least one of the N fingerprint templates as a representative fingerprint template.

In short, the apparatus may calculate the levels of similarity between a plurality of fingerprint templates, may select at least one of the plurality of fingerprint templates as a representative fingerprint template based on the results of the calculation, and may update attribute information of one or more feature points that are included in the representative fingerprint template, thereby providing a high-quality fingerprint template.

In another example, the apparatus may select, from among the N fingerprint templates, the fingerprint template with the greatest similarity level sum as a first representative fingerprint template. The apparatus may extract one or more fingerprint templates with a lower level of similarity to the first representative fingerprint template than a reference value. The apparatus may calculate and add the levels of similarity of each of the extracted fingerprint templates to the other extracted fingerprint templates. The apparatus may select, from among the extracted fingerprint templates, a fingerprint template with a greatest similarity level sum as a second representative fingerprint template. For example, in a case in which there are six fingerprint templates, the apparatus may select, from among the six fingerprint templates, a fingerprint template with a greatest similarity level sum as a first representative fingerprint template. The apparatus may extract three fingerprint templates with a lower level of similarity to the first representative fingerprint template than the reference value. The apparatus may calculate and add the levels of similarity of each of the three extracted fingerprint templates to the other two extracted fingerprint templates. The apparatus may select, from among the three extracted fingerprint templates, a fingerprint template with a greatest similarity level sum as a second representative fingerprint template.

In another example, the apparatus may classify the N fingerprint templates into a first fingerprint template group including one or more fingerprint templates and a second fingerprint template group including one or more fingerprint templates. The apparatus may calculate and add the levels of similarity of each of the first-group fingerprint templates to the other first-group fingerprint templates, and may calculate and add the levels of similarity of each of the second-group fingerprint templates to the other second-group fingerprint templates. The apparatus may select a first-group fingerprint template with a greatest similarity level sum as a first representative fingerprint template, and may select a second-group fingerprint template with a greatest similarity level sum as a second representative fingerprint template. For example, if there are six fingerprint templates and the six fingerprint templates are classified into first and second fingerprint template groups, each group including three fingerprint templates, the apparatus may calculate and add the levels of similarity of each of the three first-group fingerprint templates to the other first-group fingerprint templates, and may calculate and add the levels of similarity of each of the three second-group fingerprint templates to the other second-group fingerprint templates. The apparatus may select one of the three first-group fingerprint templates as a first representative fingerprint template. In this example, the first representative fingerprint template may be one of the three first-group fingerprint templates with a greatest similarity level sum. The apparatus may select one of the three second-group fingerprint templates as a second representative fingerprint template. In this example, the second representative fingerprint template may be one of the three second-group fingerprint templates with a greatest similarity level sum.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for generating a representative fingerprint template, comprising:
   a calculation unit configured to calculate levels of similarity between N fingerprint templates; and
   a selection unit configured to select at least one fingerprint template from among the N fingerprint templates as a representative fingerprint template,
   wherein the calculation unit is further configured to calculate and add levels of similarity of each of the N fingerprint templates to the rest of the N fingerprint templates and the selection unit is further configured to select a fingerprint template with a greatest similarity level sum from among the N fingerprint templates as a first representative fingerprint template.

2. The apparatus of claim 1, further comprising:
   an extraction unit configured to extract attribute information of one or more feature points that are included in the N fingerprint templates,
   wherein the calculation unit is further configured to calculate the levels of similarity between the N fingerprint templates by comparing the extracted attribute information.

3. The apparatus of claim 1, further comprising:
   an update unit configured to extract one or more second feature points that match one or more first feature points that are included in the representative fingerprint template from the N fingerprint templates except for the representative fingerprint template and update attribute information of the first feature points based on attribute information of the extracted second feature points.

4. The apparatus of claim 3, wherein the update unit is further configured to update the attribute information of the first feature points with a weighted sum of the attribute information of the first feature points and the attribute information of the extracted second feature points.

5. The apparatus of claim 1, further comprising:
   an extraction unit configured to extract one or more fingerprint templates with a lower level of similarity than a reference level to the first representative fingerprint template,
   wherein the calculation unit is further configured to calculate and add levels of similarity of each of the extracted fingerprint templates to the rest of the extracted fingerprint templates, and the selection unit is further configured to select a fingerprint template with a greatest similarity level sum from among the extracted fingerprint templates as a second representative fingerprint template.

6. The apparatus of claim 1, wherein the selection unit is configured to select the fingerprint template with the greatest similarity level sum as the first representative fingerprint template and select a fingerprint template with a lowest level of similarity to the first representative fingerprint template as a second representative fingerprint template.

7. The apparatus of claim 6, wherein the selection unit is further configured to select a fingerprint template with a least sum of levels of similarity to the first and second representative fingerprint templates as a third representative fingerprint template.

8. The apparatus of claim 1, further comprising:
   a classification unit configured to classify the N fingerprint templates into first and second groups, each group including one or more fingerprint templates, wherein the calculation unit is configured to calculate and add levels of similarity of each of the first-group fingerprint templates to the rest of the first-group fingerprint templates and to calculate and add levels of similarity of each of the second-group fingerprint templates to the rest of the second-group fingerprint templates and the selection unit is configured to select a first-group fingerprint template with a greatest similarity level sum and a second-group fingerprint template with a greatest similarity level sum as the first representative fingerprint template and a second representative fingerprint template, respectively.

9. A method of generating a representative fingerprint template, comprising:
   calculating levels of similarity between N fingerprint templates; and
   selecting at least one fingerprint template from among the N fingerprint templates as a representative fingerprint template,
   wherein the calculating the levels of similarity between the N fingerprint templates comprises calculating and adding levels of similarity of each of the N fingerprint templates to the rest of the N fingerprint templates and the selecting the at least one fingerprint template comprises selecting a fingerprint template with a greatest similarity level sum from among the N fingerprint templates as a first representative fingerprint template.

10. The method of claim 9, further comprising:
    extracting attribute information of one or more feature points that are included in the N fingerprint templates,
    wherein the calculating the levels of similarity between the N fingerprint templates comprises calculating the levels of similarity between the N fingerprint templates by comparing the extracted attribute information.

11. The method of claim 9, further comprising:
    extracting one or more second feature points that match one or more first feature points that are included in the representative fingerprint template from the N fingerprint templates except for the representative fingerprint template; and
    updating attribute information of the first feature points based on attribute information of the extracted second feature points.

12. The method of claim 11, wherein the updating the attribute information of the first feature points comprises updating the attribute information of the first feature points with a weighted sum of the attribute information of the first feature points and the attribute information of the extracted second feature points.

13. The method of claim 9, further comprising:
    extracting one or more fingerprint templates with a lower level of similarity than a reference level to the first representative fingerprint template,
    wherein the calculating the levels of similarity between the N fingerprint templates comprises calculating and adding levels of similarity of each of the extracted fingerprint templates to the rest of the extracted fingerprint templates, and the selecting the at least one fingerprint template comprises selecting a fingerprint template with a greatest similarity level sum from among the extracted fingerprint templates as a second representative fingerprint template.

14. The method of claim 9, wherein the selecting the at least one fingerprint template comprises selecting the fingerprint template with the greatest similarity level sum as the first representative fingerprint template and selecting a fingerprint template with a lowest level of similarity to the first representative fingerprint template as a second representative fingerprint template.

15. The method of claim 14, wherein the selecting the at least one fingerprint template further comprises selecting a fingerprint template with a least sum of levels of similarity to the first and second representative fingerprint templates as a third representative fingerprint template.

16. The method of claim 9, further comprising:
    classifying the N fingerprint templates into first and second groups, each group including one or more fingerprint templates,
    wherein the calculating the levels of similarity between the N fingerprint templates comprises calculating and adding levels of similarity of each of the first-group fingerprint templates to the rest of the first-group fingerprint templates and calculating and adding levels of similarity of each of the second-group fingerprint templates to the rest of the second-group fingerprint templates and the selecting the at least one fingerprint template comprises selecting a first-group fingerprint template with a greatest similarity level sum and a second-group fingerprint template with a greatest similarity level sum as the first representative fingerprint template and a second representative fingerprint template, respectively.

17. An apparatus for generating a representative fingerprint template, comprising:
    a calculation unit configured to calculate levels of similarity between N fingerprint templates;
    a selection unit configured to select at least one fingerprint template from among the N fingerprint templates as a representative fingerprint template; and
    an update unit configured to extract one or more second feature points that match one or more first feature points that are included in the representative fingerprint template from the N fingerprint templates except for the representative fingerprint template and update attribute information of the first feature points based on attribute information of the extracted second feature points.

18. The apparatus of claim 17, wherein the update unit is further configured to update the attribute information of the first feature points with a weighted sum of the attribute information of the first feature points and the attribute information of the extracted second feature points.

* * * * *